US011754400B2

(12) United States Patent
Chen et al.

(10) Patent No.: US 11,754,400 B2
(45) Date of Patent: Sep. 12, 2023

(54) MOTION CONSTRAINT-AIDED UNDERWATER INTEGRATED NAVIGATION METHOD EMPLOYING IMPROVED SAGE-HUSA ADAPTIVE FILTERING

(71) Applicant: SOUTHEAST UNIVERSITY, Nanjing (CN)

(72) Inventors: Xiyuan Chen, Nanjing (CN); Siyi Zhang, Nanjing (CN); Xiaotian Zhang, Nanjing (CN); Junwei Wang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/779,167

(22) PCT Filed: Jul. 28, 2021

(86) PCT No.: PCT/CN2021/108862
§ 371 (c)(1),
(2) Date: May 24, 2022

(87) PCT Pub. No.: WO2022/028286
PCT Pub. Date: Feb. 10, 2022

(65) Prior Publication Data
US 2022/0404152 A1 Dec. 22, 2022

(30) Foreign Application Priority Data
Aug. 4, 2020 (CN) .......................... 202010772026.3

(51) Int. Cl.
*G01C 21/20* (2006.01)
*G01C 21/16* (2006.01)
(52) U.S. Cl.
CPC ............. *G01C 21/20* (2013.01); *G01C 21/16* (2013.01)

(58) Field of Classification Search
CPC ...... G01C 21/20; G01C 21/16; G01C 21/165; G01C 21/005
See application file for complete search history.

(56) References Cited

U.S. PATENT DOCUMENTS

2009/0287414 A1 11/2009 Vickery
2021/0223387 A1* 7/2021 Wang ...................... G01S 7/354

FOREIGN PATENT DOCUMENTS

CN 109032178 A * 12/2018 ............. G05D 1/048
CN 109141436 A 1/2019
(Continued)

OTHER PUBLICATIONS

CN 109032178 English translation (Year: 2023).*
(Continued)

*Primary Examiner* — Jelani A Smith
*Assistant Examiner* — Paul A Castro
(74) *Attorney, Agent, or Firm* — BAYRAMOGLU LAW OFFICES, LLC

(57) ABSTRACT

A motion constraint-aided underwater integrated navigation method employing improved Sage-Husa adaptive filtering includes establishing a Doppler log error model; constructing a state equation for an underwater integrated navigation system employing Kalman filtering; according to a relationship between a centripetal acceleration and a forward velocity of an underwater vehicle, establishing a constraint condition, and constructing a complete motion constraint model; establishing two measurement equations; and establishing a filter equation, conducting calculation by using a standard Kalman filtering algorithm when an underwater glider normally runs, and conducting time updating, measurement updating and filtering updating by using an improved Sage-Husa adaptive filtering algorithm when a measurement noise varies. The motion constraint-aided underwater integrated navigation method improves a filter- (Continued)

ing accuracy of the underwater integrated navigation system, restrains a filter divergence and has robustness and reliability.

10 Claims, 6 Drawing Sheets

(56) References Cited

FOREIGN PATENT DOCUMENTS

| CN | 110146076 A | 8/2019 |
|---|---|---|
| CN | 110940340 A | 3/2020 |
| CN | 111024064 A | 4/2020 |
| CN | 112254718 A | 1/2021 |

OTHER PUBLICATIONS

Yipeng Yang, et al., A SINS/DVL Integrated Navigation Positioning Method Based on Improved Adaptive Filtering Technology, 2019 IEEE International Conference on Smart Internet of Things (SmartIoT), 2019, pp. 262-268.

Yangyang Wang, Research on the Kinematics Model of AUV and Its Application in the Integrated Navigation, Chinese Master's Theses Full-Text Database, Engineering Science and Technology II, 2019.

Xu Xiaosu, et al., SINS/DVL integrated navigation system based on adaptive filtering, J. Huazhong Univ. of Sci. & Tech. (Natural Science Edition), 2015, pp. 95-99, 106, vol. 43, No. 3.

Fan Xiaoliang, Research on Integrated Navigation Algorithm of SINS/DVL Based on Adaptive Filtering, China Master's Theses Full-text Database, Information Technology, 2019.

Wang Chong, et al., Design of AUV integrated navigation system based on Sage-husa adaptive filtering algorithm, Electronic Design Engineering, 2013, pp. 75-77,80, vol. 21, No. 15.

Wei Yan-Hui, et al., SINS/DVL Integrated Navigation System Based on Improved Adaptive Filtering Algorithm, Automation & Instrumentation, 2019, pp. 95-100, vol. 34, No. 5.

* cited by examiner

MOTION CONSTRAINT-AIDED UNDERWATER INTEGRATED NAVIGATION METHOD EMPLOYING IMPROVED SAGE-HUSA ADAPTIVE FILTERING

CROSS REFERENCE TO THE RELATED APPLICATIONS

This application is the national stage entry of International Application No. PCT/CN2021/108862, filed on Jul. 28, 2021, which is based upon and claims priority to Chinese Patent Application No. 202010772026.3 filed on Aug. 4, 2020, the entire contents of which are incorporated herein by reference.

TECHNICAL FIELD

The present invention belongs to the field of navigation guidance and control, relates to an underwater navigation method, and in particular to a motion constraint-aided underwater integrated navigation method employing improved Sage-Husa adaptive filtering.

BACKGROUND

As the technology of an underwater vehicle is maturing, the underwater vehicle has been widely concerned at home and abroad as a reliable detection tool; and how to improve the accuracy of underwater navigation has also become the focus of attention of scholars in various fields. At present, the most mature and widely applied technology is the inertial/Doppler integrated navigation technology. An inertial device is independent without depending on the characteristic of external information, so as to retain a higher reliability in the underwater environment. However, an error of the inertial device can diverge over time, affecting the positioning accuracy. However, the accuracy of a Doppler log is relatively high, and the error does not diverge over time, so that information of a velocity of strap down inertial navigation may be well corrected, improving the positioning accuracy.

However, the underwater environment is relatively complex, the underwater vehicle usually glides at a sawtooth wave at the bottom of the sea. In the gliding process, if the underwater vehicle encounters a ditch at the bottom of the sea or aggregative fish school or makes a strong maneuvering turning, an error on measurement information provided by the Doppler log can occur, and a preset measurement noise matrix cannot adapt to a disturbed model, affecting the positioning accuracy. However, when the underwater vehicle glides at the sawtooth wave or makes a strong maneuvering turning, a generated centripetal acceleration would generate a constraint to the velocity of the underwater vehicle.

SUMMARY

To solve the above problems, the present invention introduces a centripetal acceleration constraint and an improved Sage-Husa adaptive algorithm to assist inertial/Doppler integrated navigation and proposes a motion constraint-aided underwater integrated navigation method employing improved Sage-Husa adaptive filtering. When an underwater vehicle encounters a ditch at the bottom of the sea or an aggregative fish school or makes a strong maneuvering turning which cause an error on Doppler measurement information, a centripetal acceleration is introduced to constrain a velocity of the underwater vehicle, and the Sage-Husa adaptive filtering algorithm is improved, reducing a positioning error, and improving the positioning accuracy.

In order to achieve the above objective, the present invention provides the following technical solution:

a motion constraint-aided underwater integrated navigation method employing improved Sage-Husa adaptive filtering, the method including the following steps:

step 1, establishing a Doppler log error model according to the working principle of a Doppler log;

step 2, on the basis of an inertial navigation error equation, introducing a velocity error, a drift angle error and a proportionality coefficient error in the Doppler log error model to serve as state quantities of underwater integrated navigation, and constructing a state equation for an underwater integrated navigation system employing Kalman filtering;

step 3, establishing a carrier coordinate system, resolving motion of an underwater vehicle into a plane perpendicular to Z axis and a plane perpendicular to X axis; and according to a relationship between a centripetal acceleration and a forward velocity of the underwater vehicle, establishing a constraint condition, and constructing a complete motion constraint model;

step 4, establishing a first measurement equation according to navigation information of an inertial device and the Doppler log, and establishing a second measurement equation according to the complete motion constraint model in the step 2; and step 5, discretizing the state equation and the measurement equations, establishing a filter equation in combination with step 2 and step 4, conducting calculation by using a standard Kalman filtering algorithm when an underwater glider normally runs, and conducting time updating, measurement updating and filtering updating by using an improved Sage-Husa adaptive filtering algorithm when measurement noise varies.

Further, the working principle of the Doppler log in the step 1 is as follows:

two pairs of transducers in the front, back, left and right are mounted at the bottom end of the underwater vehicle to transmit wave beams in four directions respectively, Doppler shifts are obtained by measuring frequencies of transmitting wave beams and frequencies of the beams after being reflected, and then velocities of the underwater vehicle in three directions in the carrier coordinate system are obtained as follows:

$$v_x^b = \frac{c}{4f_0 \cos\alpha} f_{d13}$$

$$v_y^b = \frac{c}{4f_0 \cos\alpha} f_{d24}$$

$$v_z^b = \frac{c}{8f_0 \cos\alpha}(f_{d1} + f_{d2} + f_{d3} + f_{d4})$$

$$f_{d13} = f_{d1} - f_{d3}, \ f_{d24} = f_{d2} - f_{d4}$$

the Doppler log error model is as follows:

$$\begin{cases} \delta v_{dU} = \delta v_d \sin\beta + \delta C v_d \sin\beta \\ \delta v_{dE} = v_d \cos K_d(\gamma + \delta\Delta)\cos\beta + \delta C v_d \sin K_d \cos\beta + \delta v_d \sin K_d \cos\beta \\ \delta v_{dN} = -v_d \sin K_d(\gamma + \delta\Delta)\cos\beta + \delta C v_d \cos K_d \cos\beta + \delta v_d \cos K_d \cos\beta \end{cases}$$

where $v_d$ is the forward velocity of the underwater vehicle; c is the light velocity; $v_x$, $v_y$ and $v_z$ are velocities of the underwater vehicle in three directions in the carrier coordinate system respectively; $f_0$ is the frequency of transmitting wave; $f_{d1}$, $f_{d2}$, $f_{d3}$ and $f_{d4}$ represent the Doppler shifts; $\alpha$ is a tilt angle of the transmitting wave beams; $\delta v_{dU}$, $\delta v_{dE}$ and $\delta v_{dV}$ are velocity errors of the underwater vehicle in three directions in the East-North-Up coordinate system respectively; $\delta v_d$ is an error on Doppler velocity measurement; $\beta$ is a pitch angle of the underwater vehicle; $\delta C$ is an error on proportionality coefficient; and $K_d$, $\gamma$ and $\delta \Delta$ are errors on track considering a drift angle, an azimuth misalignment angle and the drift angle of the underwater vehicle respectively.

Further, the state equation for the underwater integrated navigation system employing Kalman filtering in the step 2 is as follows:

$$X_k = A_{k,k-1} X_{k-1} + \Gamma_{k,k-1} W_{k-1}$$

where $A_{k,k-1}$ represents a state transition matrix of the system from a time k−1 to a time k, $\Gamma_{k,k-1}$ represents a noise driving matrix of the system, and $W_{k-1}$ is a noise excitation sequence of the system;

a corresponding state vector is as follows:

$$X = [\delta L \delta \lambda \delta h \delta v_E \delta v_N \delta v_U \alpha \beta \gamma \varepsilon_x \varepsilon_y \varepsilon_z \nabla_x \nabla_y \nabla_z \delta v_d \delta \Delta \delta C]$$

where $\delta v_d$, $\delta \Delta$ and $\delta C$ are represented by following equations:

$$\begin{cases} \delta \dot{v}_d = -\beta_d \delta v_d + \omega_d \\ \delta \dot{\Delta} = -\beta_\Delta \delta \Delta + \omega_\Delta \\ \delta \dot{C} = 0 \end{cases}$$

and in the equations, $\delta L$, $\delta \lambda$ and $\delta h$ represent errors on longitude, latitude and height of a carrier respectively; $\delta v_E$, $\delta v_N$ and $\delta v_U$ are velocity errors of the carrier in the east direction, the north direction and the up direction respectively; $\alpha$, $\beta$ and $\gamma$ are errors on an attitude angle of the carrier respectively; $\varepsilon_x$, $\varepsilon_y$ and $\varepsilon_z$ are zero biases of a gyroscope; $\nabla_x$, $\nabla_y$ and $\nabla_z$ represent accelerometer zero biases; $\beta d^{-1}$ and $\beta_\Delta^{-1}$ are a time related to a velocity offset error and a time related to the drift angle error respectively; $\omega_d$ and $\omega_\Delta$ and are both excitation white noise.

Further, the step 3 specifically includes the following process:

assuming that velocities, in two directions perpendicular to the forward velocity, of the underwater vehicle are related to a flowing velocity of seawater only and that the flowing velocity is 0, the constraint condition may be obtained as follows:

$$\begin{cases} v_x^b = 0 \\ v_z^b = 0 \end{cases}$$

any motion of the underwater vehicle is resolved into a plane perpendicular to Z axis and a plane perpendicular to X axis, and following equations may be obtained according to a kinematics equation:

$$a_{rx} = v_y^b w_{nbz}^b$$

$$a_{rz} = v_y^b w_{nbx}^b$$

following equations may be obtained according to the inertial device:

$$\begin{cases} a_{rx} = f_x^b + (C_n^b g^n)_1 \\ a_{rz} = -f_z^b + (C_n^b g^n)_3 \\ v_y^b = (C_n^b v^n)_2 \\ w_{nbz}^b = w_{ibz}^b - (C_n^b (w_{ie}^n + w_{en}^n))_3 \\ w_{nbx}^b = w_{ibx}^b - (C_n^b (w_{ie}^n + w_{en}^n))_1 \end{cases}$$

so that the complete motion constraint model may be obtained:

$$\begin{cases} v_x^b = 0 \\ v_z^b = 0 \\ a_{0x} = a_{rx} - v_y^b w_{nbz}^b \\ a_{0z} = a_{rz} - v_z^b w_{nbx}^b \end{cases}$$

and then an obtained error model for a complete motion constraint is as follows:

$$\begin{cases} \delta v_x^b = (C_n^b \delta v^n)_1 - (C_n^b \phi^n \times v^n)_1 \\ \delta v_y^b = (C_n^b \delta v^n)_3 - (C_n^b \phi^n \times v^n)_3 \\ \delta a_{0x} = (C_n^b \phi^n \times v^n)_2 \omega_{ibz}^b - (C_n^b \phi^n \times g^n)_1 - \\ \quad (C_n^b \delta v^n)_2 \omega_{ibz}^b + \nabla_x^b - (C_n^b v^n)_2 \varepsilon_z^b \\ \delta a_{0z} = (C_n^b \phi^n \times v^n)_2 \omega_{ibx}^b - (C_n^b \phi^n \times g^n)_3 - \\ \quad (C_n^b \delta v^n)_2 \omega_{ibx}^b - \nabla_z^b - (C_n^b v^n)_2 \varepsilon_x^b \end{cases}$$

where $v_x^b$, $V_y^b$ and $v_z^b$ are velocities of the underwater vehicle in the carrier coordinate system respectively; $a_{rx}$ and $a_{rz}$ are centripetal acceleration values of the underwater vehicle in an X direction and a Z direction in the carrier coordinate system; $w_{ibx}^b$ and $w_{ibz}^b$ are sensitive angular velocities of the inertial device in the X axis and the Z axis respectively; $f_x^b$ and $f_z^b$ are specific force values of an accelerometer in the X axis and the Z axis respectively; and $w_{ie}^n$ and $w_{en}^n$ are a rotation angular velocity of the earth and an angular velocity caused by motion of the carrier respectively.

Further, the first measurement equation in the step 4 is as follows:

$$Z_1 = \begin{bmatrix} v_E - v_{dE} \\ v_N - v_{dN} \\ v_U - v_{dU} \end{bmatrix}$$

and the second measurement equation is as follows:

$$Z_2 = \begin{bmatrix} v_x^b \\ v_z^b \\ \delta a_{0x} \\ \delta a_{0z} \end{bmatrix}$$

where a measurement $Z_1$ is a difference between the velocities obtained by inertial navigation calculation and the velocities measured by the Doppler log; and a measurement $Z_2$ is velocity constraints of the underwater vehicle in two directions and acceleration constraints when the carrier moves.

Further, a state space model in the step 5 includes:

$$X_k = A_{k,k-1}X_{k-1} + \Gamma_{k,k-1}W_{k-1}$$

$$Z_k = H_k X_k + V_k$$

where $Z_k$ is an observation vector of a sensor at the time k; H is a transition matrix of the system from a state space to an observation space; and $V_k$ is a measurement noise sequence:

a state transition matrix A of the system is as follows:

$$A = \begin{bmatrix} A_{SINS_{9\times9}} & 0_{9\times3} & 0_{9\times3} & 0_{9\times3} \\ 0_{3\times9} & A_{Gyro_{3\times3}} & 0_{3\times3} & 0_{3\times3} \\ 0_{3\times9} & 0_{3\times3} & A_{Acc_{3\times3}} & 0_{3\times3} \\ 0_{3\times9} & 0_{3\times3} & 0_{3\times3} & 0_{DVL_{3\times3}} \end{bmatrix}$$

where $A_{SINS_{9\times9}}$, $A_{Gyro_{3\times3}}$, $A_{Acc_{3\times3}}$ and $A_{DVL_{3\times3}}$ represent the state transition matrix of the inertial navigation system, a gyroscopic drift, an inverse correlation time matrix of an accelerometer error as well as an inverse correlation matrix of the Doppler log error respectively;

a measurement matrix of the system is as follows:

$$H_1 = [0_{3\times3} \; I_{3\times3} \; S_1 \; 0_{3\times6} \; S_2]$$

where:

$$S_1 = \begin{bmatrix} -v_N & 0 & 0 \\ -v_E & 0 & 0 \\ 0 & 0 & 0 \end{bmatrix}, S_1 = \begin{bmatrix} -\sin K_d \cos\beta & -v_N & -v_E \\ -\cos K_d \cos\beta & v_E & -v_N \\ -\sin\beta & 0 & v_d \sin\beta \end{bmatrix};$$

and $$H_2 = [0_{3\times4} \; M_1 \; M_2 \; M_3 \; M_4 \; 0_{3\times4}]$$

assuming that:

$$C_n^b = \begin{bmatrix} T_{11} & T_{12} & T_{13} \\ T_{21} & T_{22} & T_{23} \\ T_{31} & T_{32} & T_{33} \end{bmatrix}$$

then:

$$M_1 = \begin{bmatrix} T_{11} & T_{12} & T_{13} \\ T_{31} & T_{33} & T_{33} \\ -T_{21}\omega_{ibz}^b & -T_{22}\omega_{ibz}^b & -T_{23}\omega_{ibz}^b \\ -T_{21}\omega_{ibx}^b & -T_{22}\omega_{ibx}^b & -T_{23}\omega_{ibx}^b \end{bmatrix}$$

$$M_2 = \begin{bmatrix} -(T_{11}v_U - T_{13}v_E) & -(T_{13}v_N - T_{12}v_U) & -(T_{12}v_E - T_{11}v_N) \\ -(T_{31}v_U - T_{33}v_E) & -(T_{33}v_N - T_{32}v_U) & -(T_{32}v_E - T_{31}v_N) \\ T_{31}g - T_{23}v_E\omega_{ibx}^b & -T_{32}g + T_{23}v_N\omega_{ibx}^b & T_{22}v_E\omega_{ibx}^b - T_{21}v_N\omega_{ibx}^b \\ T_{11}g - T_{23}v_E\omega_{ibz}^b & -T_{12}g + T_{23}v_N\omega_{ibz}^b & T_{22}v_E\omega_{ibx}^b - T_{21}v_N\omega_{ibz}^b \end{bmatrix}$$

$$M_3 = \begin{bmatrix} 0 & 0 & 0 \\ 0 & 0 & 0 \\ -(C_n^b v_n)_2 & 0 & 0 \\ 0 & 0 & -(C_n^b v_n)_2 \end{bmatrix}, M_4 = \begin{bmatrix} 0 & 0 & 0 \\ 0 & 0 & 0 \\ 0 & 0 & -1 \\ 1 & 0 & 0 \end{bmatrix};$$

where:

$$\begin{cases} E[W_k] = 0 & E[W_k W_j^T] = Q_k \delta_{kj} \\ E[V_k] = 0 & E[V_k V_j^T] = R_k \delta_{kj} \\ E[W_k V_k^T] = 0 \end{cases}.$$

Further, the calculation process of the improved Sage-Husa adaptive filtering algorithm in the step 5 is as follows:

$$\hat{X}_k = \hat{X}_{k,k-1} + K_k(Z_k - H_k \hat{X}_{k,k-1})$$

$$K_k = P_{k,k-1} H_k^T (H_k P_{k,k-1} H_k^T + R_k)^{-1}$$

$$\hat{R}_k = (1 - \beta_k)\hat{R}_{k-1} + \beta_k \left( \tilde{Z}_{k/k-1} \tilde{Z}_{k/k-1}^T - H_k P_{K/K-1} H_k^T \right)$$

$$\beta_k = \begin{cases} \dfrac{\tilde{Z}_{k/k-1}^T \tilde{Z}_{k/k-1} - tr(H_k P_{k/k-1} H_k^T) - tr(\hat{R}_{k-1})}{tr(\tilde{Z}_{k/k-1} \tilde{Z}_{k/k-1}^T - H_k P_{k/k-1} H_k^T) - tr(\hat{R}_{k-1})} & \tilde{Z}_{k/k-1}^T \tilde{Z}_{k/k-1} > tr\left[E(\tilde{Z}_{k/k-1} \tilde{Z}_{k/k-1}^T)\right] \\ 1 & \tilde{Z}_{k/k-1}^T \tilde{Z}_{k/k-1} \leq tr\left[E(\tilde{Z}_{k/k-1} \tilde{Z}_{k/k-1}^T)\right] \end{cases}$$

$$P_{k,k-1} = A_{k,k-1} P_{k-1} A_{k,k-1}^T + \Gamma_{k,k-1} Q_{k-1} \Gamma_{k,k-1}^T$$

$$P_k = (I - K_k H_k) P_{k,k-1}$$

where $X_k$ represents a state variable of the carrier at the time k; A represents the state transition matrix of the system from the time k to a time k+1;

$Z_k$ is the observation vector of the sensor at the time k; H is a transition matrix of the system from the state space to the observation space; $K_k$ is a Kalman filtering gain at the time k; Q is a noise covariance matrix of the system; R is an observation covariance matrix; and P is an error covariance matrix.

Further, the $\beta_k$ is deduced through the following process:
in Kalman filtering, equations for measuring prediction errors are as follows:

$$\tilde{Z}_{k/k-1} = Z_k - \hat{Z}_{k/k-1}$$

$$= H_k \tilde{X}_{k/k-1} + V_k - H_k \hat{X}_{k/k-1}$$

$$= H_k \tilde{X}_{k/k-1} + V_k$$

variances are calculated at the two sides at the same time to obtain:

$$E[\tilde{Z}_{k/k-1} \tilde{Z}_{k/k-1}^T] = H_k P_{k/k-1} H_k^T + R_k$$

by using a method of exponentially decreasing a weighted average, an equation may be obtained:

$$\hat{R}_k = (1-\beta_k)\hat{R}_{k-1} + \beta_k(\tilde{Z}_{k/k-1} - H_k P_{K/K-1} H_k^T)$$

whether filter divergence occurs or not is judged; general filtering is conducted if filtering is normal, and if filter divergence is detected, optimal $\beta_k$ is calculated in real time, and filter divergence is prevented; and whether filter divergence occurs or not is judged according to a following equation:

$$\tilde{Z}_{k/k-1}^T \tilde{Z}_{k/k-1} > \gamma \cdot tr[E(\tilde{Z}_{k/k-1} \tilde{Z}_{k/k-1}^T)]$$

and if the above equation holds, filter divergence is indicated, where $\gamma$ is a reserve coefficient; and when $\gamma=1$, a convergent criterion is the most rigorous, and a following equation may be obtained by employing the most rigorous convergent criterion:

$$\beta_k = \frac{\tilde{Z}_{k/k-1}^T \tilde{Z}_{k/k-1} - tr(H_k P_{k/k-1} H_k^T) - tr(\hat{R}_{k-1})}{tr(\tilde{Z}_{k/k-1} \tilde{Z}_{k/k-1}^T - H_k P_{k/k-1} H_k^T) - tr(\hat{R}_{k-1})}.$$

Further, in the step 5, the case that the measurement noise varies includes at least one of the following situations: the underwater glider encounters an obstacle or makes a strong maneuvering turning.

Further, the obstacle includes an underwater ditch and fish school.

Compared with the prior art, the present invention has the following advantages and beneficial effects that:

in the method of the present invention, a centripetal acceleration error generated when the underwater vehicle turns or makes a strong maneuvering action is introduced as a measurement; and compared with a traditional motion constraint, the motion constraint in the method is more complete and may effectively constrain the forward velocity of the carrier, to avoid a larger error on measurement information caused by strong maneuvering motion of the carrier, effectively improving the navigation accuracy of the system. For the improved Sage-Husa algorithm proposed by the present invention, on the basis of traditional Sage-Husa adaptive filtering, fault judgment on the measurement information and optimal estimation on the proportionality coefficient are added; and therefore, the amount of filtering calculations of when the measurement information is correct may be reduced, filter divergence of the system may further be reduced when a measurement information error occurs, and the method has better robustness and reliability, improving the navigation accuracy of the system. The method of the present invention is capable of effectively reducing the error when an error on the Doppler measurement information occurs, may be used for improving the underwater integrated navigation accuracy, the positioning accuracy and the fault tolerance of the navigation system and achieves more accurate operation of the underwater vehicle.

DETAILED DESCRIPTION OF THE EMBODIMENTS

The technical solution provided by the present invention will be described in detail below in combination with specific embodiments. It should be understood that these implementations are used for construing the present invention only, but not limiting its scope.

Figure 1:
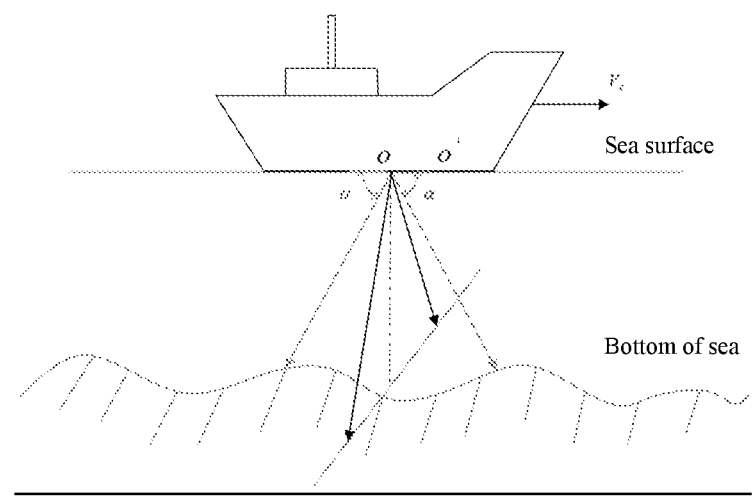
FIG. 1 is a working principle diagram of a Doppler log.

The present invention proposes a motion constraint-aided underwater integrated navigation method employing improved Sage-Husa adaptive filtering. The implementation principle and the method process are shown in FIGS. 1-4. The motion constraint-aided underwater integrated navigation method employing improved Sage-Husa adaptive filtering specifically includes the following steps:

step 1, a Doppler log error model is established according to the working principle of a Doppler log:

the principle of the Doppler log is relatively simple, as shown in FIG. 1; two pairs of transducers in the front, back, left and right are mounted at the bottom end of the underwater vehicle to transmit wave beams in four directions respectively, Doppler shifts are obtained by measuring frequencies of transmitting wave beams and frequencies of the wave beams after being reflected, and then velocities of the underwater vehicle in three directions in the carrier coordinate system are obtained as follows:

$$v_x^b = \frac{c}{4f_0\cos\alpha} f_{d13}$$

$$v_y^b = \frac{c}{4f_0\cos\alpha} f_{d24}$$

$$v_z^b = \frac{c}{8f_0\cos\alpha} (f_{d1} + f_{d2} + f_{d3} + f_{d4})$$

$$f_{d13} = f_{d1} - f_{d3}, f_{d24} = f_{d2} - f_{d4}$$

and correspondingly, the obtained Doppler log error model is as follows:

$$\begin{cases} \delta v_{dU} = \delta v_d \sin\beta + \delta C v_d \sin\beta \\ \delta v_{dE} = v_d \cos K_d(\gamma + \delta\Delta)\cos\beta + \delta C v_d \sin K_d \cos\beta + \delta v_d \sin K_d \cos\beta \\ \delta v_{dN} = -v_d \sin K_d(\gamma + \delta\Delta)\cos\beta + \delta C v_d \cos K_d \cos\beta + \delta v_d \cos K_d \cos\beta \end{cases}$$

where $v_d$ is the forward velocity of the underwater vehicle; c is the light velocity; $v_x^b$, $v_y^b$ and $v_z^b$ are velocities of the underwater vehicle in the carrier coordinate system respectively; $f_0$ is the frequency of transmitting wave; $f_{d1}$, $f_{d2}$, $f_{d3}$ and $f_{d4}$ represent the Doppler shifts; $\alpha$ is a tilt angle of the transmitting wave beams; $\delta v_{dU}$, $\delta v_{dE}$ and $\delta v_{dN}$ are velocity errors of the underwater vehicle in three directions in the East-North-Up coordinate system respectively; $\delta v_d$ is an error on Doppler velocity measurement; $\beta$ is a pitch angle of the underwater vehicle; $\delta C$ is an error on proportionality coefficient; and $K_d$, $\gamma$ and $\delta\Delta$ are errors on track considering a drift angle, an azimuth misalignment angle and the drift angle of the underwater vehicle respectively.

Figure 2:
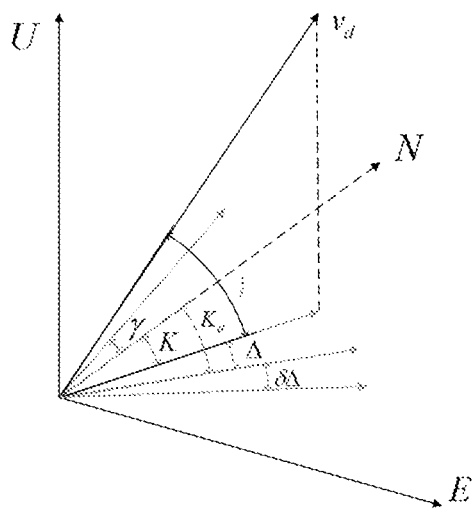
FIG. 2 is a schematic diagram of a Doppler log error model.

Step 2, on the basis of an inertial navigation error equation, a velocity error $\delta v_d$, a drift angle error $\delta\Delta$ and a proportionality coefficient error $\delta C$ in the Doppler log error model are introduced to serve as state quantities of underwater integrated navigation, as shown in FIG. 2; and a state equation for an underwater integrated navigation system employing Kalman filtering is constructed:

where the state equation for the motion constraint-aided underwater combined navigation method employing improved Sage-Husa adaptive filtering algorithm:

$$X_k = A_{k,k-1} X_{k-1} + \Gamma_{k,k-1} W_{k-1}$$

where $A_{k,k-1}$ represents a state transition matrix of the system from a time k−1 to a time k, $\Gamma_{k,k-1}$ represents a noise driving matrix of the system, and $W_{k-1}$ is a noise excitation sequence of the system. a corresponding state vector is as follows:

$$X=[\delta L\, \delta\lambda\, \delta h\, \delta v_E\, \delta v_N\, \delta v_U\, \alpha\, \beta\, \gamma\, \varepsilon_x\, \varepsilon_y\, \varepsilon_z\, \nabla_x\, \nabla_y\, \nabla_z\, \delta v_d\, \delta\Delta\, \delta C]$$

where $\delta v_d$, $\delta\Delta$ and $\delta C$ are represented by following equations:

$$\begin{cases} \delta\dot{v}_d = -\beta_d \delta v_d + \omega_d \\ \delta\dot{\Delta} = -\beta_\Delta \delta\Delta + \omega_\Delta \\ \delta\dot{C} = 0 \end{cases}$$

and in the equations, $\delta L$, $\delta\lambda$ and $\delta h$ a represent errors on longitude, latitude and height of a carrier respectively; $\delta v_E$, $\delta v_N$ and $\delta v_U$ are velocity errors of the carrier in the east direction, the north direction and the up direction respectively; $\alpha$, $\beta$ and $\gamma$ are errors on an attitude angle of the carrier respectively; $\varepsilon_x$, $\varepsilon_y$ and $\varepsilon_y$ are zero biases of a gyroscope; $\nabla_x$, $\nabla_y$ and $\nabla_z$ represent accelerometer zero biases; $\beta_d^{-1}$ and $\beta_\Delta^{-1}$ are a time related to a velocity offset error and a time related to the drift angle error respectively; and $\omega_d$ and $\omega_\Delta$ are both excitation white noise.

Figure 3:
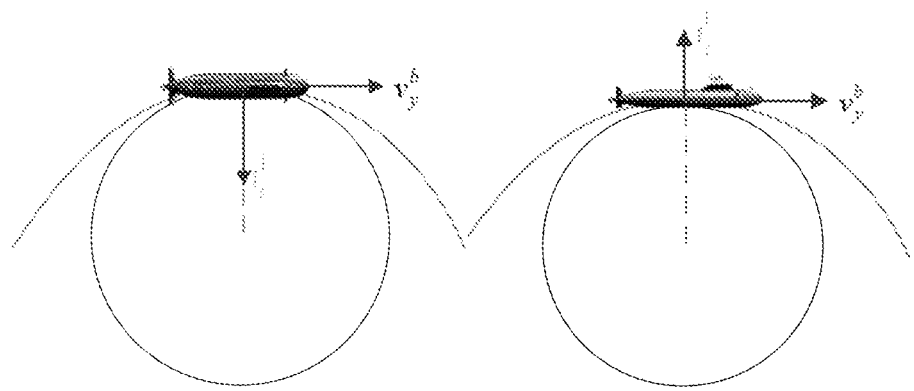
FIG. 3 is a schematic diagram of resolving motion of an underwater vehicle.

Step 3, any motion of the underwater vehicle may be resolved into two planes perpendicular to each other, specifically, a carrier coordinate system is established, and the motion of the underwater vehicle is resolved into a plane perpendicular to Z axis and a plane perpendicular to X axis, as shown in FIG. 3; and according to a relationship between a centripetal acceleration and a forward velocity of the underwater vehicle, a constraint condition is established, and a complete motion constraint model is constructed:

As a water flow rate at a certain depth at the bottom of the sea is relatively stable, assuming that velocities, in two directions perpendicular to the forward velocity, of the underwater vehicle are related to a flowing velocity of seawater only and that the flowing velocity is 0, the constraint condition may be obtained as follows:

$$\begin{cases} v_x^b = 0 \\ v_z^b = 0 \end{cases}$$

the constraint condition can constrain the velocities of the underwater vehicle in the two directions only, whereas the centripetal acceleration can be generated when the underwater vehicle turns or makes a strong maneuvering motion. Following equations may be obtained according to a kinematics equation:

$$a_{rx} = v_y^b w_{nbz}^b$$

$$a_{rz} = v_y^b w_{nbx}^b$$

following equations may be obtained according to the inertial device:

$$\begin{cases} a_{rx} = f_x^b + (C_n^b g^n)_1 \\ a_{rz} = -f_z^b + (C_n^b g^n)_3 \\ v_y^b = (C_n^b v^n)_2 \\ w_{nbz}^b = w_{ibz}^b - (C_n^b(w_{ie}^n + w_{en}^n))_3 \\ w_{nbx}^b = w_{ibx}^b - (C_n^b(w_{ie}^n + w_{en}^n))_1 \end{cases}$$

so that the complete motion constraint model may be obtained:

$$\begin{cases} v_x^b = 0 \\ v_z^b = 0 \\ a_{0x} = a_{rx} - v_y^b w_{nbz}^b \\ a_{0z} = a_{rz} - v_z^b w_{nbx}^b \end{cases}$$

and then an obtained error model for a complete motion constraint is as follows:

$$\begin{cases} \delta v_x^b = (C_n^b \delta v^n)_1 = (C_n^b \phi^n \times v^n)_1 \\ \delta v_y^b = (C_n^b \delta v^n)_3 - (C_n^b \phi^n \times v^n)_3 \\ \delta a_{0x} = (C_n^b \phi^n \times v^n)_2 \omega_{ibz}^b - (C_n^b \phi^n \times g^n)_1 - (C_n^b \delta v^n)_2 \omega_{ibz}^b + \nabla_x^b - (C_n^b v^n)_2 \varepsilon_z^b \\ \delta a_{0z} = (C_n^b \phi^n \times v^n)_2 \omega_{ibx}^b - (C_n^b \phi^n \times g^n)_3 - (C_n^b \delta v^n)_2 \omega_{ibx}^b - \nabla_z^b - (C_n^b v^n)_2 \varepsilon_x^b \end{cases}$$

where $C_n^b$ is a transition matrix from a navigation coordinate system to the carrier coordinate system; $\varnothing^n$ represents an attitude angle in the navigation coordinate system; $v^n$ is a velocity of the underwater vehicle in the navigation coordinate system; $g^n$ is a gravitational acceleration in the navigation coordinate system; $\varepsilon_x^b$ and $\varepsilon_z^b$ are zero biases of the gyroscope in the X axis and the Z axis in the carrier coordinate system; $a_{rx}$ and $a_{rz}$ are centripetal acceleration values of the underwater vehicle in an X direction and a Z direction in the carrier coordinate system; $w_{ibx}^b$ and $w_{ibz}^b$ are sensitive angular velocities of the inertial device in the X axis and the Z axis respectively; $f_x^b$ and $f_z^b$ are specific force values of an accelerometer in the X axis and the Z axis respectively; and $w_{ie}^n$ and $w_{en}^n$ are a rotation angular velocity of the earth and an angular velocity caused by motion of the carrier respectively.

Step 4, a measurement equation (1) is established according to navigation information of an inertial device and the Doppler log, and a measurement equation (2) is established according to the complete motion constraint model:

$$Z_1 = \begin{bmatrix} v_E - v_{dE} \\ v_N - v_{dN} \\ v_U - v_{dU} \end{bmatrix} \quad (1)$$

$$Z_2 = \begin{bmatrix} v_x^b \\ v_z^b \\ \delta a_{0x} \\ \delta a_{0z} \end{bmatrix} \quad (2)$$

In the equations, $v_E$, $v_N$ and $v_U$ are velocities, obtained by inertial navigation calculation, of the underwater vehicle in the east direction, the north direction and the up direction (the present invention selects the East-North-Up coordinate system as the navigation coordinate system) respectively; $v_{dE}$, $v_{dN}$ and $v_{dU}$ are velocities, measured by the Doppler log and subjected to coordinate transformation, in the east direction, the north direction and the up direction respectively; a measurement $Z_1$ is a difference between the velocities obtained by inertial navigation calculation and the velocities measured by the Doppler log; and a measurement $Z_2$ is velocity constraints of the underwater vehicle in two directions and acceleration constraints when the carrier moves. When the underwater vehicle normally works, the measurement $Z_2$ should take a value of 0, or the measurement noise should be white noise.

Figure 4:
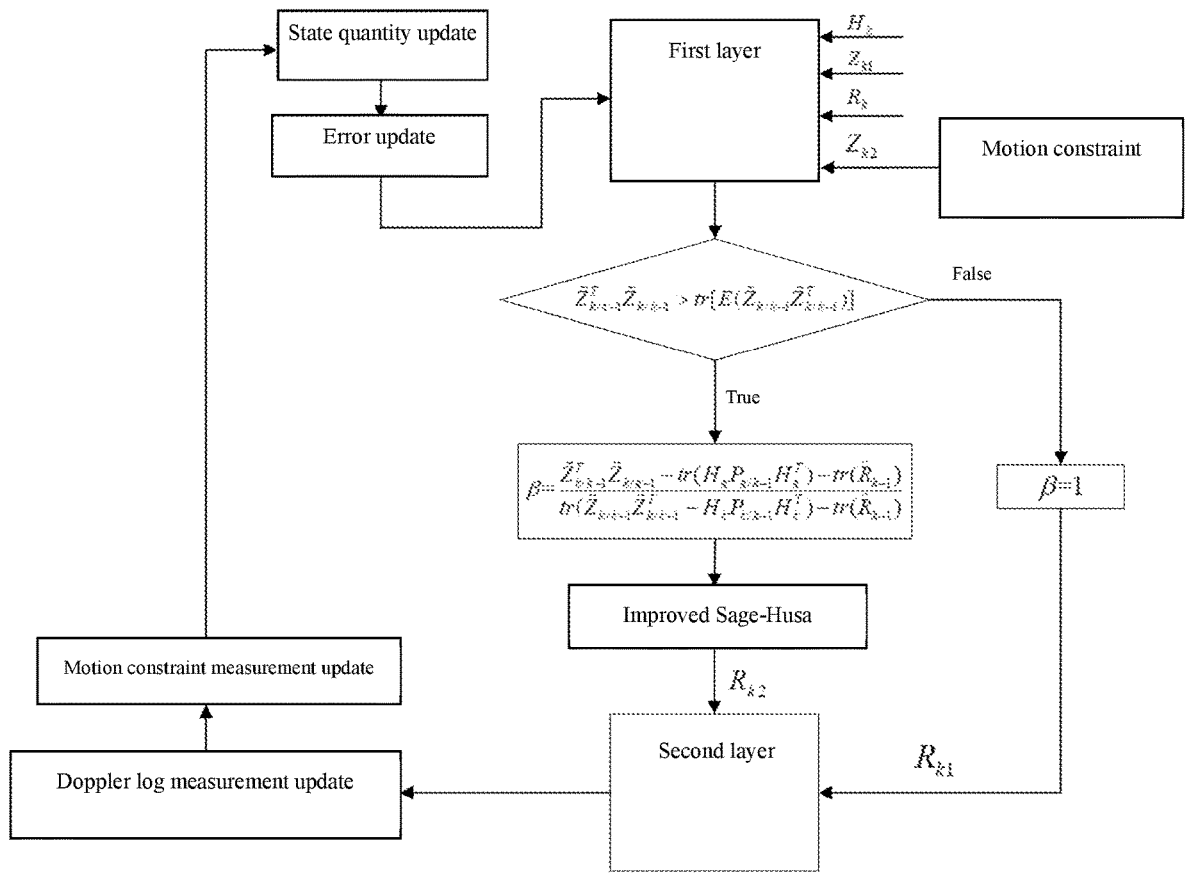
FIG. 4 is a flow chart of a motion constraint-aided algorithm employing improved Sage-Husa adaptive filtering.

Step 5, the state equation and the measurement equations are discretized, a filter equation is established in combination with step 2 and step 4; calculation is conducted by using a standard Kalman filtering algorithm when an underwater glider normally runs; and when the underwater glider encounters an underwater ditch or fish school or makes a strong maneuvering turning, and measurement noise varies, time updating, measurement updating and filtering updating are conducted by using an improved Sage-Husa adaptive filtering algorithm. The specific process is shown in FIG. 4:

in combination with steps 1-4, a state space model of the system includes a state equation and measurement equations which are specifically as follows:

$$X_k = A_{k,k-1} X_{k-1} + \Gamma_{k,k-1} W_{k-1}$$

$$Z_k = H_k X_k + V_k$$

where $Z_k$ is an observation vector of a sensor at the time k; H is a transition matrix of the system from a state space to an observation space; and $V_k$ is a measurement noise sequence:

a state transition matrix A of the system is as follows:

$$A = \begin{bmatrix} A_{SINS_{9\times9}} & 0_{9\times3} & 0_{9\times3} & 0_{9\times3} \\ 0_{3\times9} & A_{Gyro_{3\times3}} & 0_{3\times3} & 0_{3\times3} \\ 0_{3\times9} & 0_{3\times3} & A_{Acc_{3\times3}} & 0_{3\times3} \\ 0_{3\times9} & 0_{3\times3} & 0_{3\times3} & A_{DVL_{3\times3}} \end{bmatrix}$$

where $A_{SINS_{9\times9}}$, $A_{Gyro_{3\times3}}$, $A_{Acc_{3\times3}}$ and $A_{DVL_{3\times3}}$ represent the state transition matrix of the inertial navigation system, a gyroscopic drift, an inverse correlation time matrix of an accelerometer error as well as an inverse correlation matrix of the Doppler log error respectively.

a measurement matrix of the system is as follows:

$$H_1 = [0_{3\times3} I_{3\times3} S_1 0_{3\times6} S_2]$$

where:

$$S_1 = \begin{bmatrix} -v_N & 0 & 0 \\ -v_E & 0 & 0 \\ 0 & 0 & 0 \end{bmatrix}, S_1 = \begin{bmatrix} -\sin K_d \cos\beta & -v_N & -v_E \\ -\cos K_d \cos\beta & v_E & -v_N \\ -\sin\beta & 0 & v_d \sin\beta \end{bmatrix};$$

$$H_2 = [0_{3\times4} M_1 M_2 M_3 M_4 0_{3\times4}]$$

assuming that:

$$C_n^b = \begin{bmatrix} T_{11} & T_{12} & T_{13} \\ T_{21} & T_{22} & T_{23} \\ T_{31} & T_{32} & T_{33} \end{bmatrix}$$

then:

$$M_1 = \begin{bmatrix} T_{11} & T_{12} & T_{13} \\ T_{31} & T_{33} & T_{33} \\ -T_{21}^b \omega_{ibx}^b & -T_{22} \omega_{ibz}^b & -T_{23} \omega_{ibz}^b \\ -T_{21}^b \omega_{ibx}^b & -T_{22} \omega_{ibx}^b & -T_{23} \omega_{ibx}^b \end{bmatrix}$$

$$M_2 = \begin{bmatrix} -(T_{11}v_U - T_{13}v_E) & -(T_{13}v_N - T_{12}v_U) & -(T_{12}v_E - T_{11}v_N) \\ -(T_{31}v_U - T_{33}v_E) & -(T_{33}v_N - T_{32}v_U) & -(T_{32}v_E - T_{31}v_N) \\ T_{31}g - T_{23}v_E\omega_{ibx}^b & -T_{32}g + T_{23}v_N\omega_{ibx}^b & T_{22}v_E\omega_{ibx}^b - T_{21}v_N\omega_{ibx}^b \\ T_{11}g - T_{23}v_E\omega_{ibz}^b & -T_{12}g + T_{23}v_N\omega_{ibz}^b & T_{22}v_E\omega_{ibx}^b - T_{21}v_N\omega_{ibz}^b \end{bmatrix}$$

$$M_3 = \begin{bmatrix} 0 & 0 & 0 \\ 0 & 0 & 0 \\ -(C_n^b v_n)_2 & 0 & 0 \\ 0 & 0 & -(C_n^b v_n)_2 \end{bmatrix}, M_4 = \begin{bmatrix} 0 & 0 & 0 \\ 0 & 0 & 0 \\ 0 & 0 & -1 \\ 1 & 0 & 0 \end{bmatrix};$$

where:

$$\begin{cases} E[W_k] = 0 & E[W_k W_j^T] = Q_k \delta_{kj} \\ E[V_k] = 0 & E[V_k V_j^T] = R_k \delta_{kj} \\ E[W_k V_k^T] = 0 \end{cases}$$

in the underwater integrated navigation system, system state noise is relatively stable usually, and therefore, the present invention only conducts adaptive filtering on the measurement noise in Kalman filtering, equations for measuring prediction errors are as follows:

$$\tilde{Z}_{k/k-1} = Z_k - \hat{Z}_{k/k-1}$$
$$= H_k \tilde{X}_{k/k-1} + V_k - H_k \hat{X}_{k/k-1}$$
$$= H_k \tilde{X}_{k/k-1} + V_k$$

variances are calculated at the two sides at the same time to obtain:

$$E[\tilde{Z}_{k/k-1} \tilde{Z}_{k/k-1}^T] = H_k P_{k/k-1} H_k^T + R_k$$

by using a method of exponentially decreasing a weighted average, an equation may be obtained:

$$\hat{R}_k = (1-\beta_k) \hat{R}_{k-1} + \beta_k (\tilde{Z}_{k/k-1} \tilde{Z}_{k/k-1}^T - H_k P_{K/K-1} H_k^T)$$

In traditional Sage-Husa filtering, it is believed that:

$$\beta_k = \frac{1-b}{1-b_k}$$

where b is a fading factor. However, with increase in number k of filterings, $b_k$ may approach 0, a weight of adaptive filtering may approach 1-b and would keep invariable; and meanwhile, a weight value distributed to $\hat{R}_k$ by an initial value $\hat{R}_0$ attenuates gradually and approaches a constant value 0 gradually. Due to the above reasons, the adaptation degree of a noise estimator is lowered, followed by weakening of the filtering accuracy.

According to a predicted residual method, whether filter divergence occurs or not may be artificially judged; if filtering is normal, general filtering is conducted; and if filter divergence is detected, optimal $\beta_k$ is calculated in real time, and filter divergence is prevented.

A filter divergence criterion is as follows:

$$\tilde{Z}_{k/k-1}^T \tilde{Z}_{k/k-1} > \gamma \cdot tr[E(\tilde{Z}_{k/k-1} \tilde{Z}_{k/k-1}^T)]$$

and if the above equation holds, filter divergence is indicated, where $\gamma$ is a reserve coefficient; and when $\gamma=1$, a convergent criterion is the most rigorous, and a following equation may be obtained by employing the most rigorous convergent criterion:

$$\tilde{Z}_{k/k-1}^T \tilde{Z}_{k/k-1} = tr\left[E\left(\tilde{Z}_{k/k-1}\tilde{Z}_{k/k-1}^T\right)\right]$$
$$= tr\left(H_k P_{k/k-1} H_k^T + R_k\right)$$

$R_k$ in the equation is substituted by $\hat{R}_k$, and a following equation may be obtained:

$$\tilde{Z}_{k/k-1}^T \tilde{Z}_{k/k-1} = tr\left[E\left(\tilde{Z}_{k/k-1}\tilde{Z}_{k/k-1}^T\right)\right]$$
$$= tr\left(\begin{array}{c} H_k P_{k/k-1} H_k^T + (1-\beta_k)\hat{R}_{k-1} + \beta_k \\ \left(\tilde{Z}_{k/k-1}\tilde{Z}_{k/k-1}^T - H_k P_{K/K-1}H_k^T\right) \end{array}\right)$$

solve to obtain:

$$\beta_k = \frac{\tilde{Z}_{k/k-1}^T \tilde{Z}_{k/k-1} - tr\left(H_k P_{k/k-1} H_k^T\right) - tr\left(\hat{R}_{k-1}\right)}{tr\left(\tilde{Z}_{k/k-1}\tilde{Z}_{k/k-1}^T - H_k P_{k/k-1} H_k^T\right) - tr\left(\hat{R}_{k-1}\right)}$$

From the above equations:

$$\beta_k = \begin{cases} \dfrac{\left(\begin{array}{c}\tilde{Z}_{k/k-1}^T \tilde{Z}_{k/k-1} - \\ tr\left(H_k P_{k/k-1}H_k^T\right) - tr\left(\hat{R}_{k-1}\right)\end{array}\right)}{\left(tr\left(\begin{array}{c}\tilde{Z}_{k/k-1}\tilde{Z}_{k/k-1}^T - \\ H_k P_{k/k-1}H_k^T\end{array}\right) - tr\left(\hat{R}_{k-1}\right)\right)} & \tilde{Z}_{k/k-1}^T\tilde{Z}_{k/k-1} > tr\left[E\left(\tilde{Z}_{k/k-1}\tilde{Z}_{k/k-1}^T\right)\right] \\ 1 & \tilde{Z}_{k/k-1}^T\tilde{Z}_{k/k-1} \leq tr\left[E\left(\tilde{Z}_{k/k-1}\tilde{Z}_{k/k-1}^T\right)\right] \end{cases}$$

Therefore, the algorithm employing improved Sage-Husa adaptive filtering in step 5 has the following process:

$$X_k = X_{k,k-1} + K_k(Z_k - H_k X_{k,k-1})$$
$$K_k = P_{k,k-1} H_k^T \left(H_k P_{k,k-1} H_k^T + R_k\right)^{-1}$$
$$\hat{R}_k = (1-\beta_k)\hat{R}_{k-1} + \beta_k\left(\tilde{Z}_{k/k-1}\tilde{Z}_{k/k-1}^T - H_k P_{K/K-1}H_k^T\right)$$

$$\beta_k = \begin{cases} \dfrac{\left(\begin{array}{c}\tilde{Z}_{k/k-1}^T \tilde{Z}_{k/k-1} - \\ tr\left(H_k P_{k/k-1}H_k^T\right) - tr\left(\hat{R}_{k-1}\right)\end{array}\right)}{\left(tr\left(\begin{array}{c}\tilde{Z}_{k/k-1}\tilde{Z}_{k/k-1}^T - \\ H_k P_{k/k-1}H_k^T\end{array}\right) - tr\left(\hat{R}_{k-1}\right)\right)} & \tilde{Z}_{k/k-1}^T\tilde{Z}_{k/k-1} > tr\left[E\left(\tilde{Z}_{k/k-1}\tilde{Z}_{k/k-1}^T\right)\right] \\ 1 & \tilde{Z}_{k/k-1}^T\tilde{Z}_{k/k-1} \leq tr\left[E\left(\tilde{Z}_{k/k-1}\tilde{Z}_{k/k-1}^T\right)\right] \end{cases}$$

$$P_{k,k-1} = A_{k,k-1} P_{k-1} A_{k,k-1}^T + \Gamma_{k,k-1} Q_{k-1} \Gamma_{k,k-1}^T$$
$$P_k = (I - K_k H_k) P_{k,k-1}$$

where $X_k$ represents a state variable of the carrier at the time k; A represents the state transition matrix of the system from the time k to a time k+1;

$Z_k$ is the observation vector of the sensor at the time k; H is a transition matrix of the system from the state space to the observation space; $K_k$ is a Kalman filtering gain at the time k; Q is a noise covariance matrix of the system; R is an observation covariance matrix; and P is an error covariance matrix.

Specific Embodiment

Figure 5:
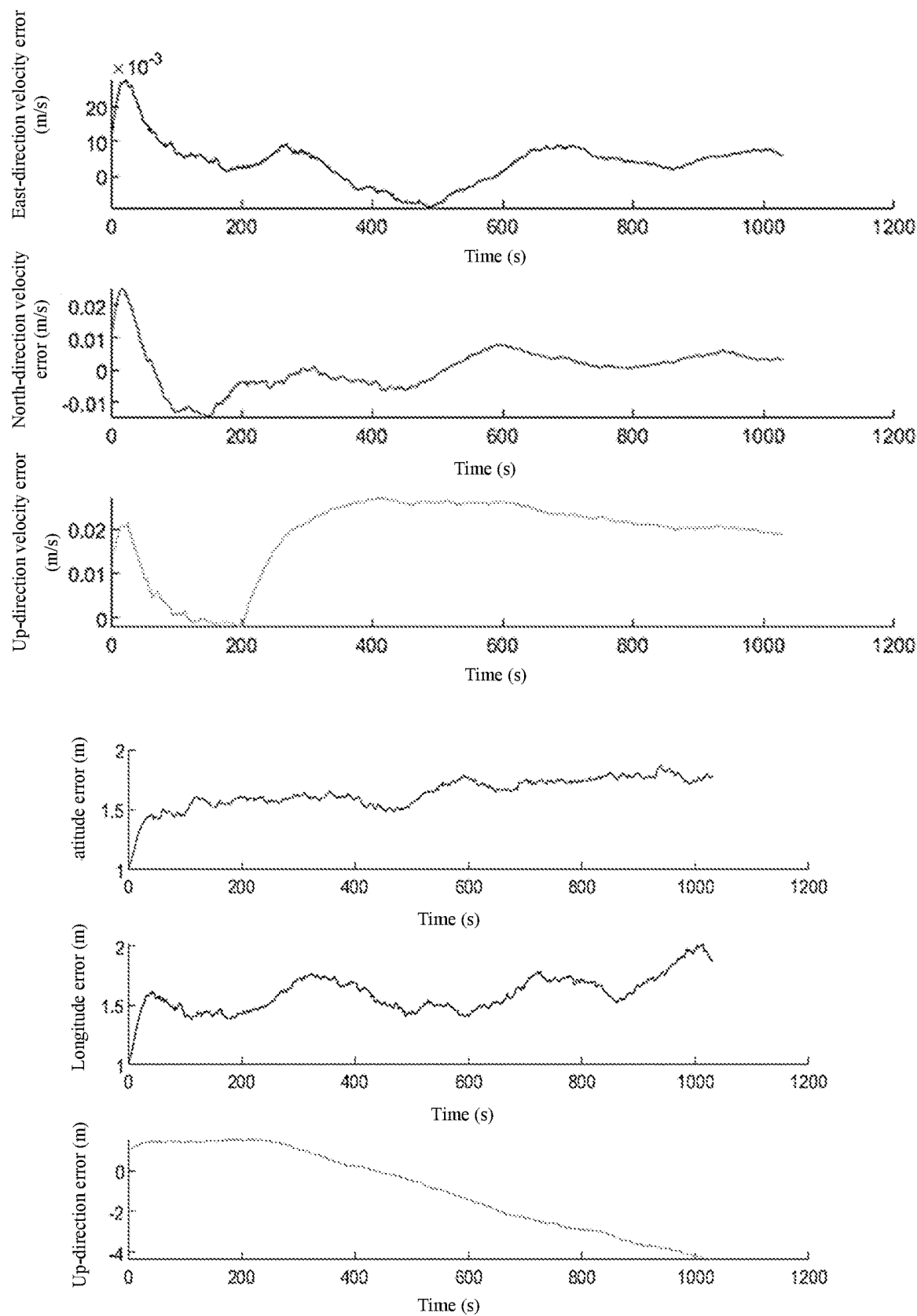
FIG. 5 are diagrams of position and velocity errors of a navigation system with a standard Kalman filtering algorithm.
Figure 6:
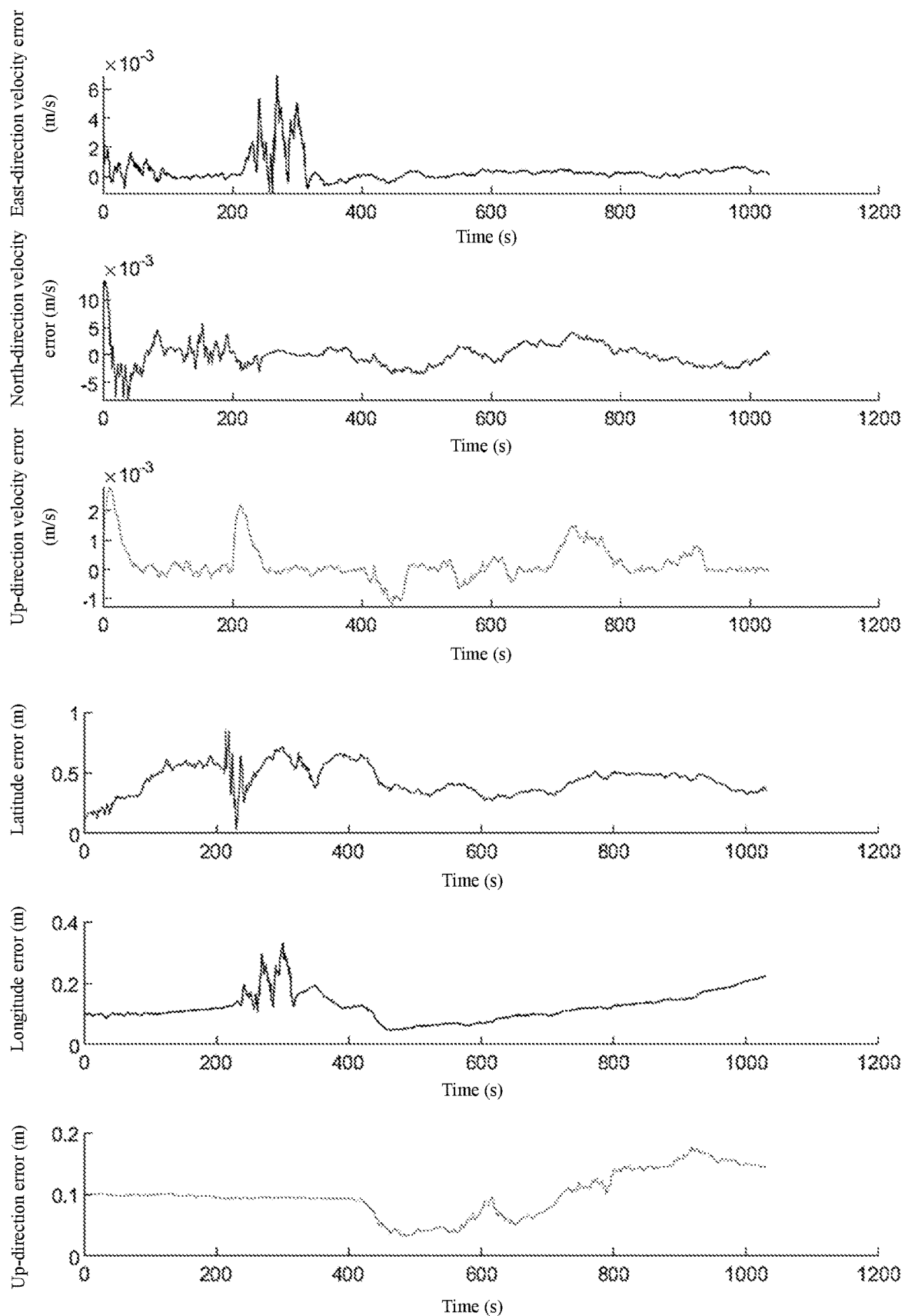
FIG. 6 are diagrams of position and velocity errors of a navigation system with a motion constraint-aided algorithm employing an improved Sage-Husa adaptive filtering.

In order to verify the correctness of a proposed algorithm, provided is a simulation test based on a Matlab platform herein, and simulation parameters are set as follows:

1. Settings of Inertial Element Indexes and Navigation Initial Parameters:

$\sigma_{\delta r}^2(0) = (1\ m)^2$ $\sigma_{\delta v}^2(0) = (0.1\ m/s)^2$ $\sigma_{\delta \alpha}^2(0) = \sigma_{\delta \beta}^2(0) = (10^*)^2 \sigma_{\delta \gamma}^2(0) = (1')^2$ Zero bias stability of gyroscope: eb=0.2°/h
Zero bias stability of accelerometer: db=100 ug
Angle random walk: web=0.018°/√h
DVL velocity offset error: $\sigma_{\delta v_d}^2 = (0.01\ m/s)^2$
DVL drift angle error: $\sigma_{\delta A}^2 = (1')^2$
DVL calibration factor error: $\sigma_{\delta C}^2 = (0.001)^2$ 2. Error Analysis In combination with the above parameters, comparison is conducted by employing a standard Kalman filtering algorithm and a motion constraint-aided underwater integrated navigation method employing improved Sage-Husa adaptive filtering of the present invention. FIG. 5 shows position errors and velocity errors of the integrated system with the standard Kalman filtering algorithm. It can be seen that with the standard Kalman filtering algorithm, there is lack of knowledge of the characteristic of statistical noise of the system at the beginning of experimental calculation, and a filtering error is relatively large. By using the improved Sage-Husa adaptive filtering algorithm with additional motion constraints, velocities of the carrier in three directions are constrained, adaptive filtering is conducted on measurement noise, divergence of an error of the integrated system may be well restrained, and the navigation accuracy of the system is further greatly improved, as shown in FIG. 6.

Figure 7:
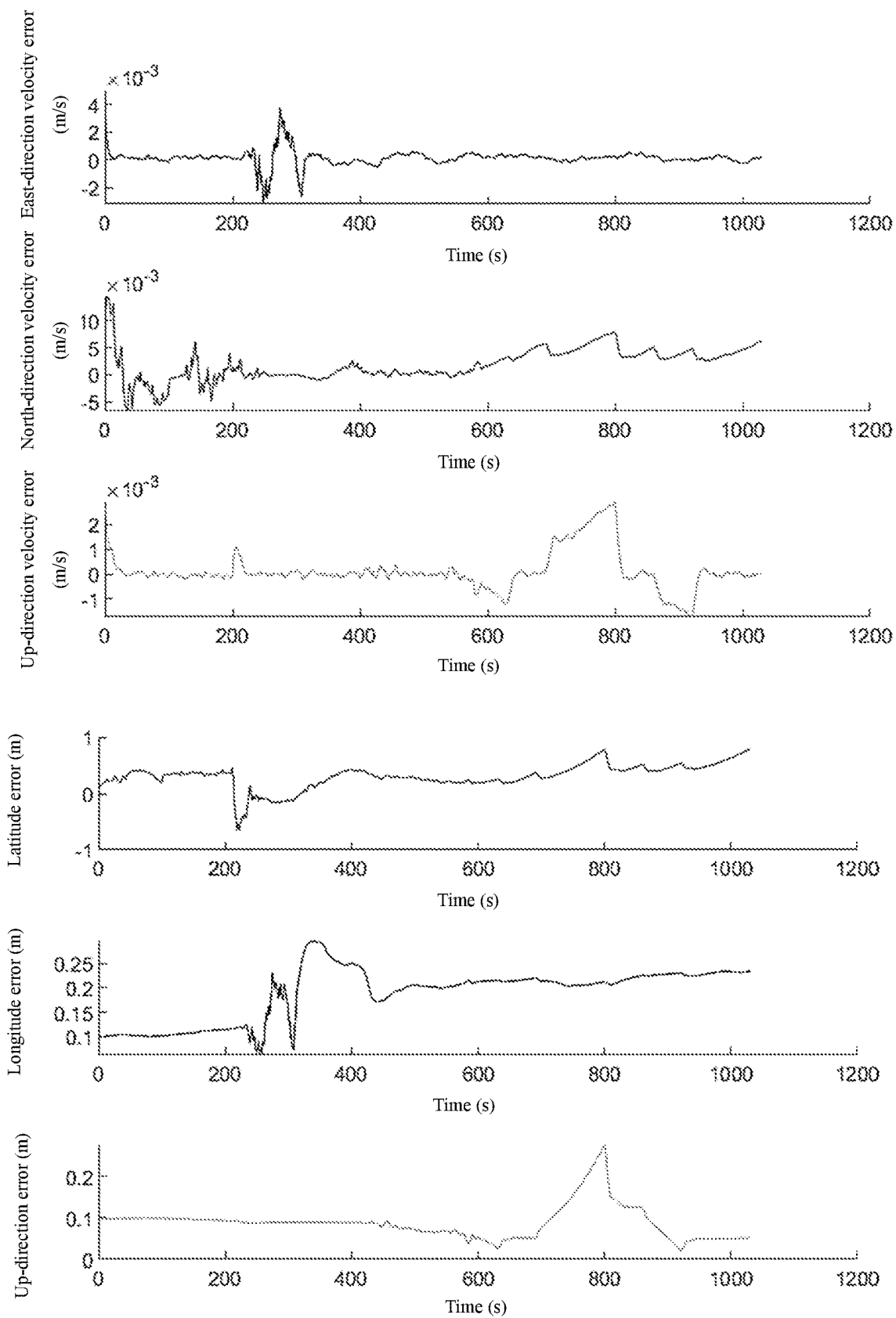
FIG. 7 are diagrams of position and velocity errors of a navigation system with a motion constraint-aided Sage-Husa adaptive algorithm when measurement noise is interfered.
Figure 8:
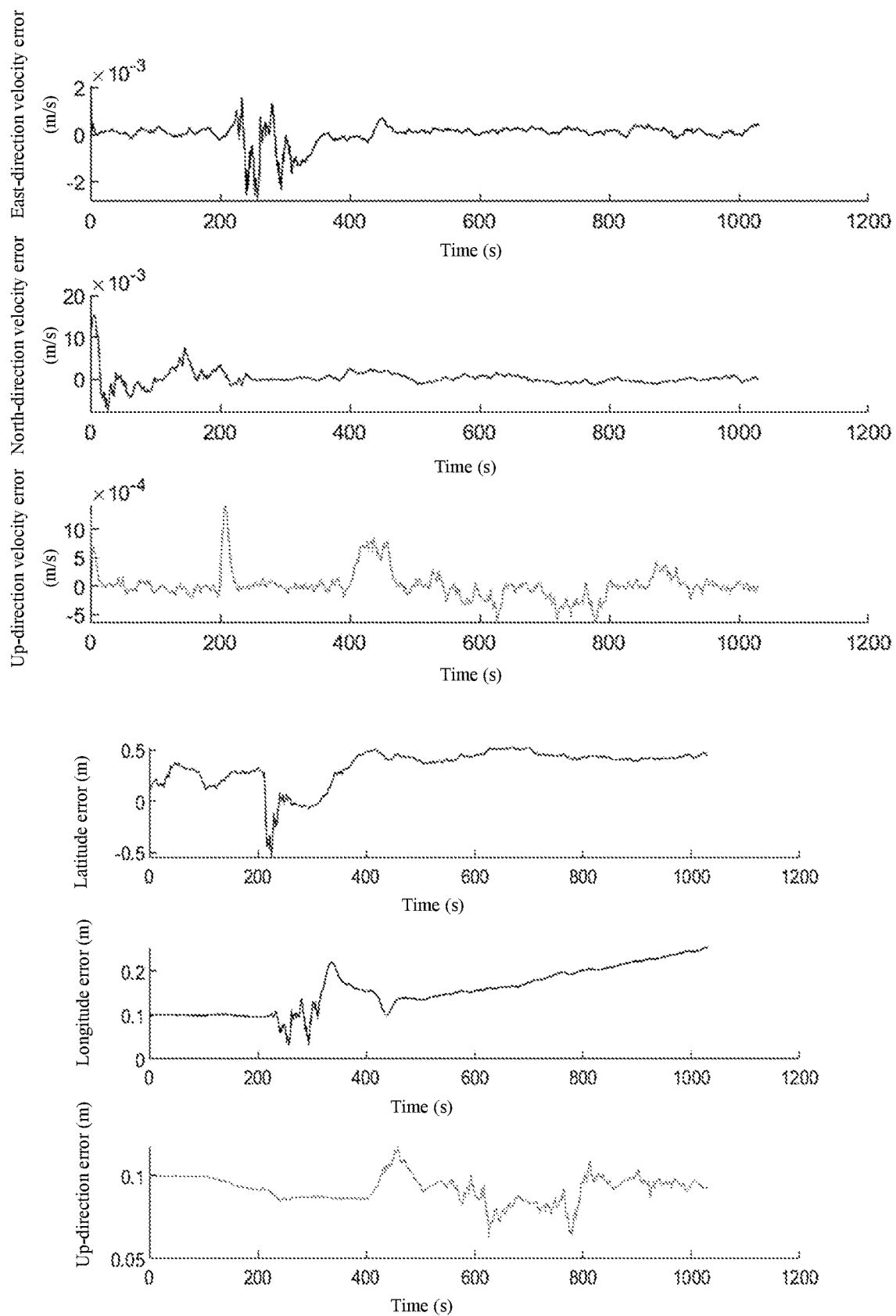
FIG. 8 are diagrams of position and velocity errors of a navigation system with a motion constraint-aided improved Sage-Husa adaptive algorithm when measurement noise is interfered.

In order to verify the performance of improved adaptive filtering in the case of filter divergence, ten times the measurement noise is added at measurements in a time interval from 600 s to 610 s. FIG. 7 and FIG. 8 show the navigation error situations of the system before and after improvement in Sage-Husa adaptive filtering algorithm respectively. With the improved Sage-Husa adaptive filtering algorithm, filter divergence may be well restrained, improving the accuracy and the robustness of the navigation system.

The technical means disclosed by the technical solution of the present invention are not limited to these disclosed in the above implementations and further include the technical solution formed by any combination of the above technical features. It should be noted that several improvements and embellishments may also be made without departing from the principles of the present invention to those of ordinary skill in the art, and these improvements and embellishments should also be considered to fall within the scope of the present invention.

What is claimed is:

1. A motion constraint-aided underwater integrated navigation method performed by an underwater vehicle, wherein the underwater vehicle comprises a right front transducer, a left front transducer, a right back transducer, and a left back transducer mounted at a bottom end of the underwater vehicle to transmit wave beams in four directions, respectively, and wherein the method employs an improved Sage-Husa adaptive filtering, and comprises the following steps:

step 1, establishing, by the underwater vehicle, a Doppler log error model according to a working principle of a Doppler log;

step 2, on a basis of an inertial navigation error equation, introducing, by the underwater vehicle, a velocity error, a drift angle error and a proportionality coefficient error in the Doppler log error model to serve as state quantities of an underwater integrated navigation, and constructing a state equation for an underwater integrated navigation system employing Kalman filtering;

step 3, establishing, by the underwater vehicle, a carrier coordinate system, resolving a motion of the underwater vehicle into a plane perpendicular to Z axis and a plane perpendicular to X axis; and according to a relationship between a centripetal acceleration and a forward velocity of the underwater vehicle, establishing a constraint condition, and constructing a complete motion constraint model;

step 4, establishing, by the underwater vehicle, a first measurement equation according to navigation information of an inertial device and the Doppler log, and establishing a second measurement equation according to the complete motion constraint model in the step 2; and step 5, discretizing, by the underwater vehicle, the state equation and the first measurement equation and the second measurement equation, establishing a filter equation in combination with step 2 and step 4, conducting calculation by using a standard Kalman filtering algorithm when an underwater glider is used, conducting time updating, measurement updating and filtering updating by using an improved Sage-Husa adaptive filtering algorithm when measurement noise varies, and introducing, by the underwater vehicle, a centripetal acceleration to constrain a velocity of the underwater vehicle.

2. The motion constraint-aided underwater integrated navigation method employing improved Sage-Husa adaptive filtering according to claim 1, wherein the working principle of the Doppler log in the step 1 is as follows:

Doppler shifts are obtained by measuring frequencies of transmitting wave beams and frequencies of the wave beams after being reflected, and then velocities of the underwater vehicle in three directions in the carrier coordinate system are obtained as follows:

$$v_x^b = \frac{c}{4f_0\cos\alpha}f_{d13};$$

$$v_y^b = \frac{c}{4f_0\cos\alpha}f_{d24};$$

$$v_z^b = \frac{c}{8f_0\cos\alpha}(f_{d1}+f_{d2}+f_{d3}+f_{d4});$$

$$f_{d13}=f_{d1}-f_{d3}, f_{d24}=f_{d2}-f_{d4};$$

the Doppler log error model is as follows:

$$\begin{cases} \delta v_{dU} = \delta v_d \sin\beta + \delta C v_d \sin\beta \\ \delta v_{dE} = v_d \cos K_d(\gamma+\delta\Delta)\cos\beta + \delta C v_d \sin K_d \cos\beta + \delta v_d \sin K_d \cos\beta \\ \delta v_{dN} = -v_d \sin K_d(\gamma+\delta\Delta)\cos\beta + \delta C v_d \cos K_d \cos\beta + \delta v_d \cos K_d \cos\beta \end{cases};$$

wherein $v_d$ is the forward velocity of the underwater vehicle; c is a light velocity; $v_x^b$, $v_y^b$ and $v_z^b$ are velocities of the underwater vehicle in the carrier coordinate system respectively;

$f_0$ is the frequency of the transmitting wave beams;

$f_{d1}$, $f_{d2}$, $f_{d3}$ and $f_{d4}$ represent the Doppler shifts; $\alpha$ is a tilt angle of the transmitting wave beams;

$\delta v_{dU}$, $\delta v_{dE}$ and $\delta v_{dN}$ are velocity errors of the underwater vehicle in three directions in an East-North-Up coordinate system respectively;

$\delta v_d$ is an error on a Doppler velocity measurement;

$\beta$ is a pitch angle of the underwater vehicle;

$\delta C$ is an error on a proportionality coefficient; and $K_d$, $\gamma$ and $\delta\Delta$ are errors on a track considering a drift angle, an azimuth misalignment angle and the drift angle of the underwater vehicle respectively.

3. The motion constraint-aided underwater integrated navigation method employing improved Sage-Husa adaptive filtering according to claim 1, wherein the state equation for the underwater integrated navigation system employing the Kalman filtering in the step 2 is as follows:

$$X_k = A_{k,k-1}X_{k-1} + \Gamma_{k,k-1}W_{k-1};$$

wherein $A_{k,k-1}$ represents a state transition matrix of the underwater integrated navigation system from a time k−1 to a time k, $\Gamma_{k,k-1}$ represents a noise driving matrix of the underwater integrated navigation system, and $W_{k-1}$ is a noise excitation sequence of the underwater integrated navigation system;

a corresponding state vector is as follows:

$$X=[\delta L \delta\lambda \delta h \delta v_E \delta v_N \delta v_U \alpha \beta \gamma \varepsilon_x \varepsilon_y \varepsilon_z \nabla_x \nabla_y \nabla_z \delta v_d \delta\Delta \delta C]$$

wherein $\delta v_d$, $\delta\Delta$ and $\delta C$ are represented by following equations:

$$\begin{cases} \delta\dot{v}_d = -\beta_d \delta v_d + \omega_d \\ \delta\dot{\Delta} = -\beta_\Delta \delta\Delta + \omega_\Delta \\ \delta\dot{C} = 0 \end{cases};$$

in the equations, $\delta L$, $\delta\lambda$ and $\delta h$ represent errors on a longitude, a latitude and a height of a carrier respectively;

$\delta v_E$, $\delta v_N$ and $\delta v_U$ are velocity errors of the carrier in an east direction, a north direction and an up direction respectively;

$\alpha$, $\beta$ and $\gamma$ are errors on an attitude angle of the carrier respectively;

$\varepsilon_x$, $\varepsilon_y$ and $\varepsilon_y$ are zero biases of a gyroscope;

$\nabla_x$, $\nabla_y$ and $\nabla_z$ represent accelerometer zero biases;

$\beta_d^{-1}$ and $\beta_\Delta^{-1}$ are a time related to a velocity offset error and a time related to the drift angle error respectively; and $\omega_d$ and $\omega_\Delta$ are both excitation white noise.

4. The motion constraint-aided underwater integrated navigation method employing improved Sage-Husa adaptive filtering according to claim 1, wherein the step 3 specifically comprises the following process:

assuming that the velocities, in two directions perpendicular to the forward velocity, of the underwater vehicle are related to a flowing velocity of seawater only and the flowing velocity is 0, the constraint condition is obtained as follows:

$$\begin{cases} v_x^b = 0 \\ v_z^b = 0 \end{cases};$$

the motion of the underwater vehicle is resolved into the plane perpendicular to the Z axis and the plane perpendicular to the X axis, and following equations are obtained according to a kinematics equation:

$$a_{rx}=v_y^b w_{nbz}^b;$$

$$a_{rz}=v_y^b w_{nbxhu\ b};$$

following equations are obtained according to the inertial device:

$$\begin{cases} a_{rx} = f_x^b + (C_n^b g^n)_1 \\ a_{rz} = -f_z^b + (C_n^b g^n)_3 \\ v_y^b = (C_n^b v^n)_2 \\ w_{nbz}^b = w_{ibz}^b - (C_n^b(w_{ie}^n + w_{en}^n))_3 \\ w_{nbx}^b = w_{ibx}^b - (C_n^b(w_{ie}^n + w_{en}^n))_1 \end{cases}$$

wherein the complete motion constraint model is obtained:

$$\begin{cases} v_x^b = 0 \\ v_z^b = 0 \\ a_{0x} = a_{rx} - v_y^b w_{nbz}^b \\ a_{0z} = a_{rz} - v_z^b w_{nbx}^b \end{cases};$$

and then an obtained error model for a complete motion constraint is as follows:

$$\begin{cases} \delta v_x^b = (C_n^b \delta v^n)_1 - (C_n^b \phi^n \times v^n)_1 \\ \delta v_y^b = (C_n^b \delta v^n)_3 - (C_n^b \phi^n \times v^n)_3 \\ \delta a_{0x} = (C_n^b \phi^n \times v^n)_2 \omega_{ibz}^b - (C_n^b \phi^n \times g^n)_1 - (C_n^b \delta v^n)_2 \omega_{ibz}^b + \nabla_x^b - (C_n^b v^n)_2 \varepsilon_z^b \\ \delta a_{0z} = (C_n^b \phi^n \times v^n)_2 \omega_{ibx}^b - (C_n^b \phi^n \times g^n)_3 - (C_n^b \delta v^n)_2 \omega_{ibx}^b - \nabla_z^b - (C_n^b v^n)_2 \varepsilon_x^b \end{cases};$$

wherein $C_n^b$ is a transition matrix from a navigation coordinate system to the carrier coordinate system;

$\varnothing^n$ represents an attitude angle in the navigation coordinate system;

$v^n$ is a velocity of the underwater vehicle in the navigation coordinate system;

$g^n$ is a gravitational acceleration in the navigation coordinate system;

$\varepsilon_x^b$ and $\varepsilon_z^b$ are zero biases of a gyroscope in the X axis and the Z axis in the carrier coordinate system;

$a_{rx}$ and $a_{rz}$ are centripetal acceleration values of the underwater vehicle in an X direction and a Z direction in the carrier coordinate system;

$w_{ibx}^b$ and $w_{ibz}^b$ are sensitive angular velocities of the inertial device in the X axis and the Z axis respectively;

$f_x^b$ and $f_z^b$ are specific force values of an accelerometer in the X axis and the Z axis respectively; and $\omega_{ie}^n$ and $w_{en}^n$ are a rotation angular velocity of the earth and an angular velocity caused by a motion of a carrier respectively.

5. The motion constraint-aided underwater integrated navigation method employing improved Sage-Husa adaptive filtering according to claim 1, wherein the first measurement equation in the step 4 is as follows:

$$Z_1 = \begin{bmatrix} v_E - v_{dE} \\ v_N - v_{dN} \\ v_U - v_{dU} \end{bmatrix};$$

and the second measurement equation is as follows:

$$Z_2 = \begin{bmatrix} v_x^b \\ v_z^b \\ \delta a_{0x} \\ \delta a_{0z} \end{bmatrix};$$

wherein $v_E$, $v_N$ and $v_U$ are velocities, obtained by an inertial navigation calculation, of the underwater vehicle in an east direction, a north direction and an up direction respectively;

$v_{dE}$, $v_{dN}$ and $v_{dU}$ are velocities, measured by the Doppler log and subjected to a coordinate transformation, in the east direction, the north direction and the up direction respectively;

a measurement $z_1$ is a difference between the velocities obtained by the inertial navigation calculation and the velocities measured by the Doppler log; and a measurement $Z_2$ is velocity constraints of the underwater vehicle in two directions and acceleration constraints when a carrier moves.

6. The motion constraint-aided underwater integrated navigation method employing improved Sage-Husa adaptive filtering according to claim 1, wherein a state space model in the step 5 comprises:

$$X_k = A_{k,k-1} X_{k-1} + \Gamma_{k,k-1} W_{k-1};$$

$$Z_k = H_k X_k + V_k;$$

wherein $Z_k$ is an observation vector of a sensor at a time k;

H is a transition matrix of the underwater integrated navigation system from a state space to an observation space;

$V_k$ is a measurement noise sequence;

a state transition matrix A of the underwater integrated navigation system is as follows:

$$A = \begin{bmatrix} A_{SINS_{9\times9}} & 0_{9\times3} & 0_{9\times3} & 0_{9\times3} \\ 0_{3\times9} & A_{Gyro_{3\times3}} & 0_{3\times3} & 0_{3\times3} \\ 0_{3\times9} & 0_{3\times3} & A_{Acc_{3\times3}} & 0_{3\times3} \\ 0_{3\times9} & 0_{3\times3} & 0_{3\times3} & A_{DVL_{3\times3}} \end{bmatrix};$$

wherein $A_{SINS_{9\times9}}$, $A_{Gyro_{3\times3}}$, $A_{Acc_{3\times3}}$ and $A_{DVL_{3\times3}}$ represent state transition matrixes of an inertial navigation system, a gyroscopic drift, an inverse correlation time matrix of an accelerometer error as well as an inverse correlation matrix of the Doppler log error respectively;

a measurement matrix of the underwater integrated navigation system is as follows:

$$H_1 = [0_{3\times3} I_{3\times3} S_1 0_{3\times6} S_2];$$

wherein:

$$S_1 = \begin{bmatrix} -v_N & 0 & 0 \\ -v_E & 0 & 0 \\ 0 & 0 & 0 \end{bmatrix}, S_1 = \begin{bmatrix} -\sin K_d \cos\beta & -v_N & -v_E \\ -\cos K_d \cos\beta & v_E & -v_N \\ -\sin\beta & 0 & v_d \sin\beta \end{bmatrix};$$

$$H_2 = [0_{3\times4} M_1 M_2 M_3 M_4 0_{3\times4}];$$

assuming:

$$C_n^b = \begin{bmatrix} T_{11} & T_{12} & T_{13} \\ T_{21} & T_{22} & T_{23} \\ T_{31} & T_{32} & T_{33} \end{bmatrix};$$

then:

$$M_1 = \begin{bmatrix} T_{11} & T_{12} & T_{13} \\ T_{31} & T_{33} & T_{33} \\ -T_{21}\omega_{ibz}^b & -T_{22}\omega_{ibz}^b & -T_{23}\omega_{ibz}^b \\ -T_{21}\omega_{ibx}^b & -T_{22}\omega_{ibx}^b & -T_{23}\omega_{ibx}^b \end{bmatrix};$$

$$M_2 = \begin{bmatrix} -(T_{11}v_U - T_{13}v_E) & -(T_{13}v_N - T_{12}v_U) & -(T_{12}v_E - T_{11}v_N) \\ -(T_{31}v_U - T_{33}v_E) & -(T_{33}v_N - T_{32}v_U) & -(T_{32}v_E - T_{31}v_N) \\ T_{31}g - T_{23}v_E\omega_{ibx}^b & -T_{32}g + T_{23}v_N\omega_{ibx}^b & T_{22}v_E\omega_{ibx}^b - T_{21}v_N\omega_{ibx}^b \\ T_{11}g - T_{23}v_E\omega_{ibz}^b & -T_{12}g + T_{23}v_N\omega_{ibz}^b & T_{22}v_E\omega_{ibz}^b - T_{21}v_N\omega_{ibz}^b \end{bmatrix};$$

$$M_3 = \begin{bmatrix} 0 & 0 & 0 \\ 0 & 0 & 0 \\ -(C_n^b v_n)_2 & 0 & 0 \\ 0 & 0 & -(C_n^b v_n)_2 \end{bmatrix}, M_4 = \begin{bmatrix} 0 & 0 & 0 \\ 0 & 0 & 0 \\ 0 & 0 & -1 \\ 1 & 0 & 0 \end{bmatrix};$$

wherein:

$$\begin{cases} E[W_k] = 0 & E[W_k W_j^T] = Q_k \delta_{kj} \\ E[V_k] = 0 & E[V_k V_j^T] = R_k \delta_{kj} \\ E[W_k V_k^T] = 0 \end{cases}$$

7. The motion constraint-aided underwater integrated navigation method employing improved Sage-Husa adaptive filtering according to claim 1, wherein a calculation process of the improved Sage-Husa adaptive filtering algorithm in the step 5 is as follows:

$$X_k = X_{k,k-1} + K_k(Z_k - H_k X_{k,k-1});$$

$$K_k = P_{k,k-1} H_k^T (H_k P_{k,k-1} H_k^T + R_k)^{-1};$$

$$\hat{R}_k = (1 - \beta_k)\hat{R}_{k-1} + \beta_k(\tilde{Z}_{k/k-1}\tilde{Z}_{k/k-1}^T - H_k P_{K/K-1} H_k^T);$$

$$\beta_k = \begin{cases} \dfrac{\tilde{Z}_{k/k-1}^T \tilde{Z}_{k/k-1} - tr(H_k P_{k,k-1} H_k^T) - tr(\hat{R}_{k-1})}{tr\left(\tilde{Z}_{k/k-1}\tilde{Z}_{k/k-1}^T - H_k P_{k/k-1} H_k^T\right) - tr(\hat{R}_{k-1})} & \tilde{Z}_{k/k-1}^T \tilde{Z}_{k/k-1} > tr\left[E\left(\tilde{Z}_{k/k-1}\tilde{Z}_{k/k-1}^T\right)\right] \\ 1 & \tilde{Z}_{k/k-1}^T \tilde{Z}_{k/k-1} \leq tr\left[E\left(\tilde{Z}_{k/k-1}\tilde{Z}_{k/k-1}^T\right)\right] \end{cases};$$

$$P_{k,k-1} = A_{k,k-1} P_{k-1} A_{k,k-1}^T + \Gamma_{k,k-1} Q_{k-1} \Gamma_{k,k-1}^T;$$

$$P_k = (I - K_k H_k) P_{k,k-1};$$

wherein $X_k$ represents a state variable of a carrier at a time k;

A represents a state transition matrix of the underwater integrated navigation system from the time k to a time k+1;

$Z_k$ is an observation vector of a sensor at the time k;

H is a transition matrix of the underwater integrated navigation system from a state space to an observation space;

$K_k$ is a Kalman filtering gain at the time k;

Q is a noise covariance matrix of the underwater integrated navigation system;

R is an observation covariance matrix; and

P is an error covariance matrix.

8. The motion constraint-aided underwater integrated navigation method employing improved Sage-Husa adaptive filtering according to claim 7, wherein the $\beta_k$ is deduced through the following process:

in the Kalman filtering, equations for measuring prediction errors are as follows:

$$\tilde{Z}_{k/k-1} = Z_k - \hat{Z}_{k/k-1}$$
$$= H_k \tilde{X}_{k/k-1} + V_k - H_k \hat{X}_{k/k-1};$$
$$= H_k \tilde{X}_{k/k-1} + V_k$$

variances are calculated at two sides at a same time to obtain:

$$E[\tilde{Z}_{k/k-1}\tilde{Z}_{k/k-1}^T] = H_k P_{k/k-1} H_k^T + R_k;$$

by using a method of exponentially decreasing a weighted average, an equation is obtained:

$$\hat{R}_k = (1-\beta_k)\hat{R}_{k-1} + \beta_k(\tilde{Z}_{k/k-1}\tilde{Z}_{k/k-1}^T - H_k P_{K/K-1} H_k^T);$$

whether a filter divergence occurs or not is judged;

a general filtering is conducted if a filtering is normal, and when the filter divergence is detected, an optimal $\beta_k$ is calculated in real time, and the filter divergence is prevented; and whether the filter divergence occurs or not is judged according to a following equation:

$$\tilde{Z}_{k/k-1}^T \tilde{Z}_{k/k-1} > \gamma \cdot tr[E(\tilde{Z}_{k/k-1}\tilde{Z}_{k/k-1}^T)];$$

and if the above equation holds, the filter divergence is indicated, wherein $\gamma$ is a reserve coefficient; and when $\gamma=1$, a convergent criterion is the most rigorous, and a following equation is obtained by employing a most rigorous convergent criterion:

$$\beta_k = \frac{\tilde{Z}_{k/k-1}^T \tilde{Z}_{k/k-1} - tr(H_k P_{k/k-1} H_k^T) - tr(\hat{R}_{k-1})}{tr(\tilde{Z}_{k/k-1}\tilde{Z}_{k/k-1}^T - H_k P_{k/k-1} H_k^T) - tr(\hat{R}_{k-1})}.$$

9. The motion constraint-aided underwater integrated navigation method employing improved Sage-Husa adaptive filtering according to claim 1, wherein in the step 5, a case that the measurement noise varies comprises at least one of the following situations:

the underwater glider encounters an obstacle or makes a maneuvering turning.

10. The motion constraint-aided underwater integrated navigation method according to claim 1, wherein an obstacle comprises an underwater ditch and a fish school.

* * * * *